United States Patent [19]
Endo et al.

[11] Patent Number: 5,707,243
[45] Date of Patent: Jan. 13, 1998

[54] DISTRIBUTING BOARD FOR ELECTRICAL CONNECTION

[75] Inventors: Takayoshi Endo; Toshiharu Kawashima, both of Shizuoka-ken; Yoshitaka Miura, Kanagawa-ken, all of Japan

[73] Assignees: Yazaki Corporation, Tokyo; Nissan Motor Co., Ltd., Kanagawa-ken, both of Japan

[21] Appl. No.: 696,420

[22] Filed: Aug. 13, 1996

[30] Foreign Application Priority Data

Aug. 15, 1995 [JP] Japan ................... 7-208193

[51] Int. Cl.⁶ .................................................. H01R 9/09
[52] U.S. Cl. .................. 439/76.2; 439/688; 439/860
[58] Field of Search ................................. 439/76.2, 685, 439/77, 81, 688, 856, 857, 860, 694, 882

[56] References Cited

U.S. PATENT DOCUMENTS

| | | | |
|---|---|---|---|
| 4,109,992 | 8/1978 | Hughes et al. | 439/685 |
| 4,684,765 | 8/1987 | Beck et al. | 439/76.2 |
| 4,894,018 | 1/1990 | Phillips et al. | 439/81 |

FOREIGN PATENT DOCUMENTS 5-30037  5/1993  Japan.

*Primary Examiner*—Neil Abrams
*Assistant Examiner*—T. C. Patel
*Attorney, Agent, or Firm*—Finnegan, Henderson, Farabow, Garrett & Dunner, L.L.P.

[57] ABSTRACT

A distributing board for electrical connection with an instrument having a tab terminal is provided. The distributing board includes a baseplate with recesses and a guide groove, a cover for covering the baseplate, female terminal metal fittings accommodated in the recesses and an electrical wire accommodated in the guide groove to connect the female terminal metal fittings with each other electrically. Each female terminal metal fitting includes a terminal fitting part for fitting the tab terminal and a pressure welding part. Under condition that the electrical wire is accommodated in the guide groove, the baseplate is covered with the cover. Since the female terminal metal fittings can be electrically connected with each other by welding the electrical wires on the individual female terminal metal fittings with pressure, it is possible to cope with changes in circuit easily.

10 Claims, 6 Drawing Sheets

DISTRIBUTING BOARD FOR ELECTRICAL CONNECTION

BACKGROUND OF THE INVENTION

1. Field of the Invention

The present invention relates to a distributing board usable for electrical connection for a vehicle. For example, in a transmission casing of an automatic transmission, such an electrical connection may be between tab terminals of a solenoid valve for hydraulic control and a wire harness extending from an interior of the transmission casing to the outside.

2. Description of the Related Art

Generally, in an automatic transmission for vehicle, a plurality of solenoid valves for hydraulic control are dispersed inside an oil pan at the bottom of the transmission casing and immersed in working oil. Wire distributing means in the form of a board is used for connecting the tab terminals of the solenoid valves to the wire harness. Such a distributing board for electrical connection is disclosed in Japanese Patent Publication No. 5-30037.

The distributing board includes a bus-bar (metal bus strip) constituting an internal circuit, which is disposed in a space defined between a baseplate and a cover. The bus-bar is provided with an orifice which acts as a female terminal, into which a male terminal of the solenoid valve is may be engaged.

In the conventional distributing board discussed above, the bus-bar formed by press-forming constitutes the interior circuit while a punching hole formed at the same time by press forming constitutes the female terminal, thus, it is impossible to easily adapt to changes in the circuit. In addition, the bus-bar has to be large in order to attain an electrical connection with the tab terminals covering a wide area. Thus, it follows that material yield in pressing worsens a disadvantage in manufacturing cost. Further, since such a press-forming process requires a large pressing machine, problems with dimensional accuracy of the distributing board may result.

SUMMARY OF THE INVENTION

It is therefore an object of the present invention to provide a distributing board for electrical connection, which is capable of easily adapting to changes in circuits and which is cost efficient while allowing manufacture with improved accuracy.

The object of the present invention described above is achieved by a distributing board for electrical connection with an instrument having a tab terminal, the distributing board comprising a baseplate provided with recesses and a guide groove connecting the recesses with each other, the baseplate being made of an insulating material, a cover for covering the baseplate, female terminal metal fittings accommodated in the respective recesses and an electrical wire accommodated in the guide groove to connect the female terminal metal fittings with each other electrically.

Each of the female terminal metal fittings comprises:

a terminal fitting part for fitting the tab terminal inserted from outside of the distributing board into the baseplate in a perpendicular direction, and a pressure welding part to which the electrical wire can be pressure welded, wherein, when the electrical wire is accommodated in the guide groove, the baseplate is covered with the cover.

With the arrangement discussed above, because the female terminal metal fittings can be electrically connected with each other by pressure welding the electrical wires on individual female terminal metal fittings, it is possible to easily adapt to changes in the circuit. Further, the arrangement of the invention does not adopt a method of wiring by means of bus-bars, and there is no waste in material caused by press forming. Therefore, the manufacturing costs can be reduced. In addition, since the pressure-welding type of female terminal metal fittings are arranged independently of each other, it is possible to improve the positional accuracy of the metal fittings with respect to tab terminals of an instrument, other connectors etc.

In the present invention, preferably, the electrical wire is a solid copper wire. Because of the use of solid copper wires, it is possible to easily adapt to changes in the circuit.

In the present invention, it is preferable that each of the recesses is formed so as to be somewhat larger than each of the female terminal metal fittings. Consequently, when the tab terminal of the instrument is inserted, each female terminal metal fitting can move in the recess, following the inserted tab terminal.

More preferably, in the present invention, the guide groove has a width larger than a diameter or a width of the electrical wire. Thus, the electrical wire is capable of moving in the guide groove corresponding to movement of the female terminal metal fittings.

It is also preferable that the pressure welding part is in the form of a box having two opposing fitting plates. Such an arrangement of the fitting plates allows the electrical wire to be securely pressure welded.

In the fitting plates discussed above, it is preferable that each of the opposing fitting plates is provided with opposing cutting edges. Thus, by depressing the electrical wire between the opposing cutting edges of the fitting plate, it is possible to easily attain the electrical connection between the electrical wire and the pressure welding part.

In the present invention, it is also preferable that the terminal fitting part of the female terminal metal fitting comprises a flat plate part having a rectangular opening formed therein and a plurality of plate springs extending from the flat plate part in an arched configuration. Such an arched configuration of the plate springs allows the tab terminal of the instrument to be easily inserted.

In the above embodiment, it is preferable that the plate springs include a center plate spring and two lateral plate springs, one on either side of the center plate spring. Further, the center plate spring has a free end curved so as to abut on a center line which passes through a center of a width of the rectangular opening in the longitudinal direction of the rectangular opening of each of the female terminal metal fittings, and which line is perpendicular to the longitudinal direction. The lateral plate springs have respective free ends curved so as to also abut on the center line.

It is also preferable that the baseplate has oblong insertion holes formed in bottoms of the recesses.

More preferably, the female terminal metal fittings are accommodated in each of the recesses of the baseplate, respectively, and positioned so that the center line passing through the rectangular opening coincides with each of the oblong insertion holes. Consequently, if only inserting the tab terminal into the oblong insertion hole, the tab terminal will be in frictional contact with the plate springs, such that the electrical connection between the tab terminal and the female terminal metal fitting is accomplished.

These and other objects and features of the present invention will become more fully apparent from the following description and appended claims taken in conjunction with the accompany drawings.

DESCRIPTION OF THE PREFERRED EMBODIMENT

Figure 1:
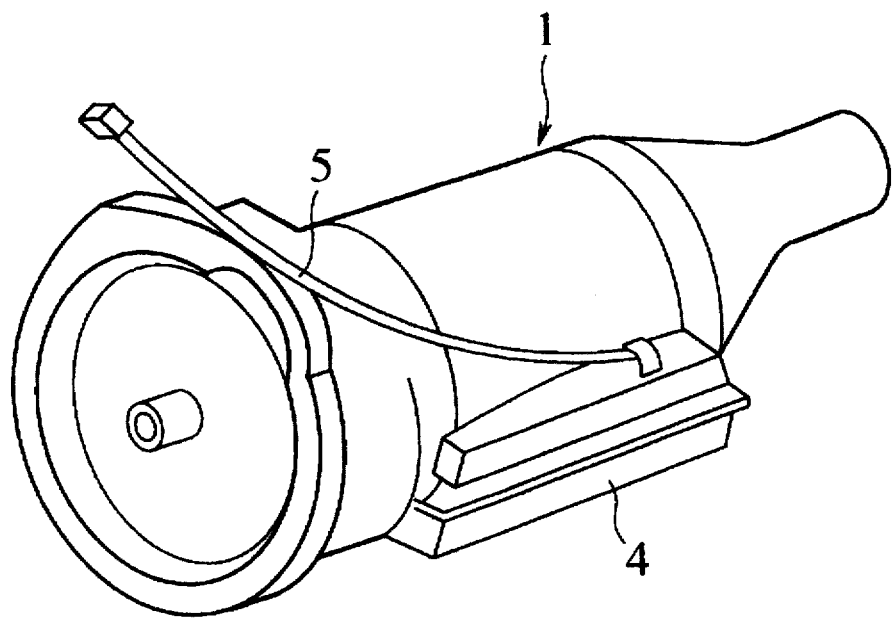
FIG. 1 is a perspective view showing an automatic transmission provided with a distributing board for electrical connection of the present invention.
Figure 2:
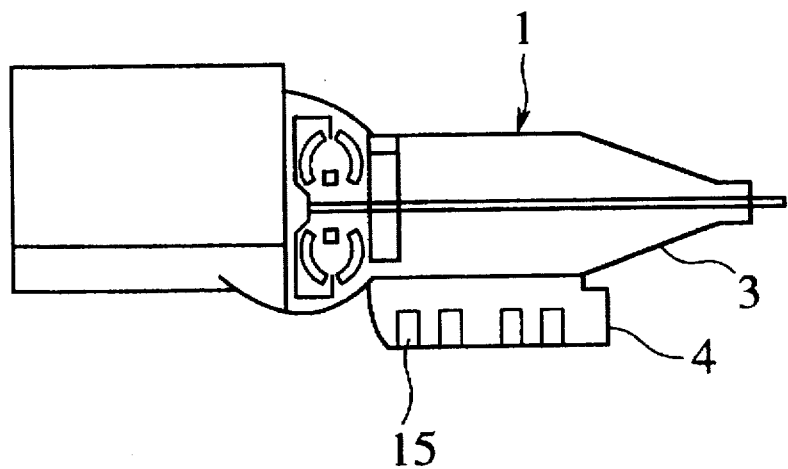
FIG. 2 is a schematic cross sectional view of the automatic transmission, of FIG. 1 showing one example of an arrangement of solenoid valves contained therein.

An embodiment of the present invention will be described with reference to the drawings. As shown in FIGS. 1 and 2, an automatic transmission 1 includes a plurality of solenoid valves 15 for a hydraulic control device. The solenoid valves 15 are dispersed inside an oil pan 4 at the bottom of a transmission casing 3 and immersed in working oil. A distributing board of the invention is used for connecting terminals of the solenoid valves with a wire harness 5 extending out of the transmission casing 3.

Figure 3:
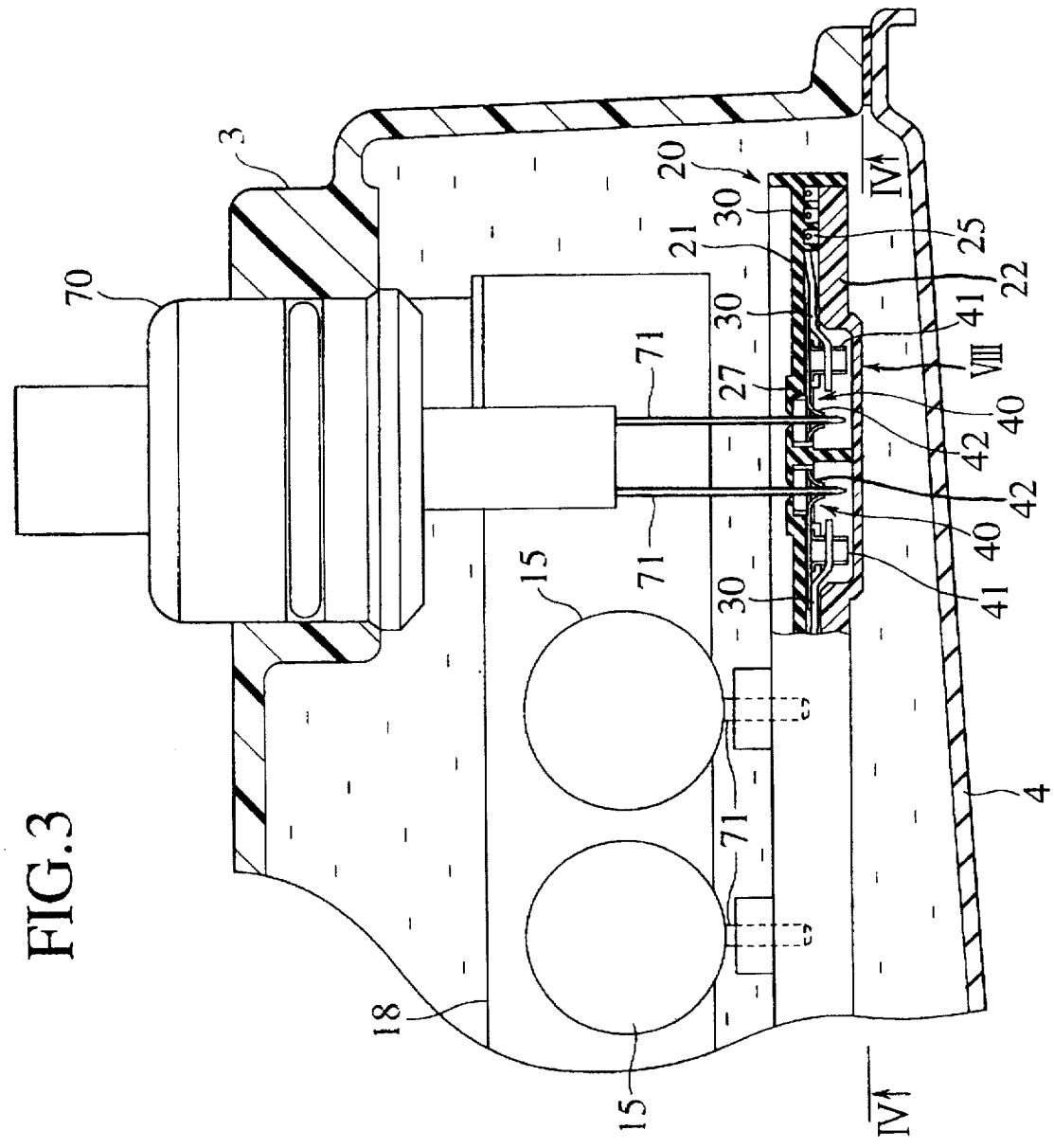
FIG. 3 is a partial cross sectional view of an essential part of the automatic transmission, showing the distributing board for electrical connection in accordance with an embodiment of the present invention in use.
Figure 4:
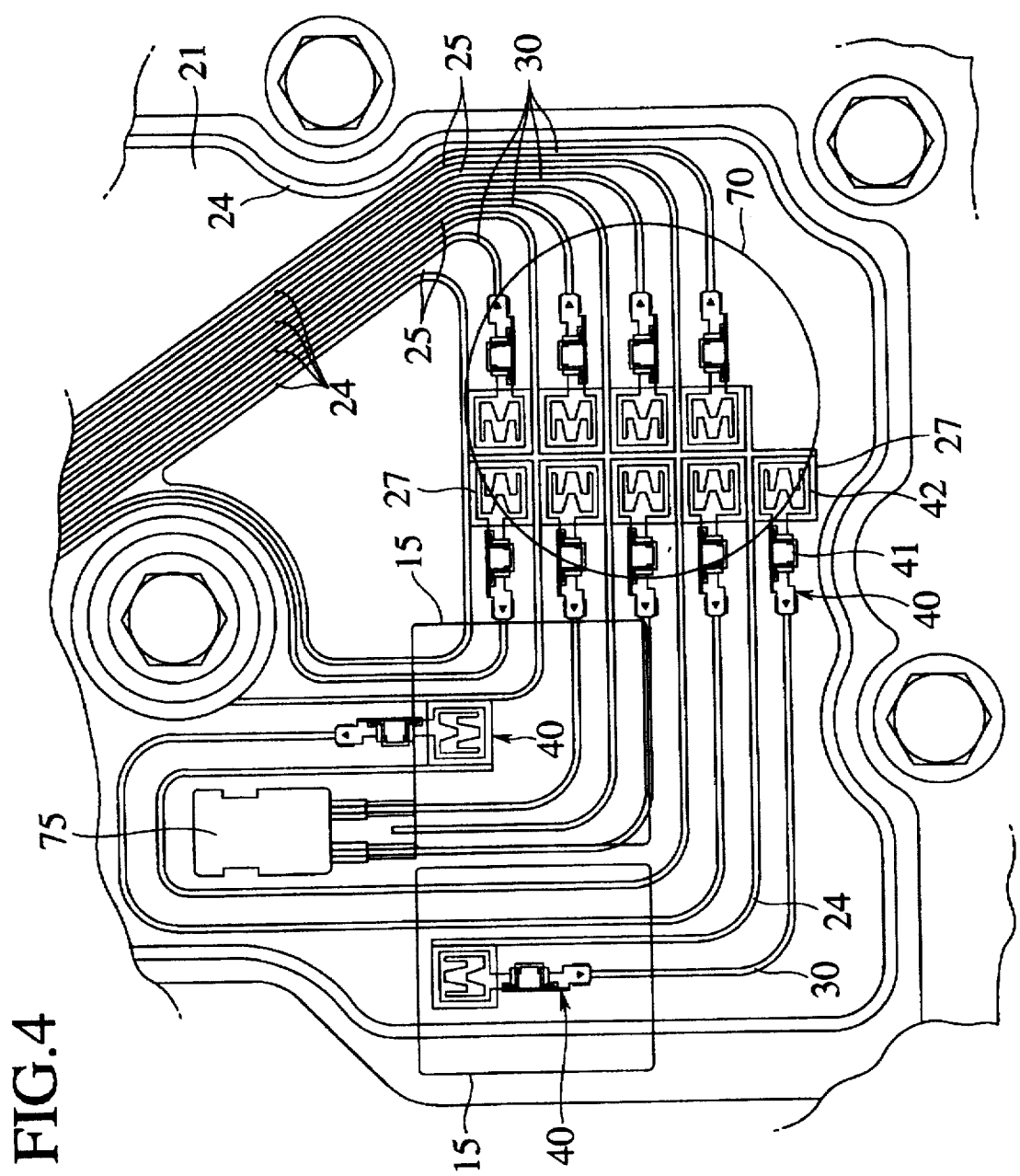
FIG. 4 shows the distributing board for electrical connection, viewed along line IV—IV of FIG. 3, in accordance with an embodiment of the present invention.

FIG. 3 is a cross sectional view showing the distributing board 20 in use, in accordance with an embodiment of the invention and FIG. 4 shows the distributing board 20 viewed along a line IV—IV of FIG. 3.

The distributing board 20 is accommodated in a lower space defined between the transmission casing 3 and the oil pan 4 and immersed in the working oil. In FIG. 3, reference numeral 18 designates a valve body, and 70 a connector to be connected with an end of the wire harness 5. The connector 70 has tab terminals 71 inserted perpendicularly into the distributing board 20 and electrically connected to respective metal fittings 40 as female terminals. Note, the metal fittings 40 will be referred to "the female terminal metal fittings", hereinafter. In FIG. 4, reference numeral 75 denotes an oil temperature sensor.

The distributing board 20 included a baseplate 21 made of an insulating material, a cover 22 for covering an under face of the baseplate 21, solid copper wires 30 constituting an internal circuit, and the female terminal metal fittings 40 arranged corresponding to respective positions of the solenoid valves 15 and the connector 70. Each of the female terminal metal fittings 40 includes a pressure welding part 41 which permits the solid copper wire 30 to be pressure welded and a terminal fitting part 42 for engagement with the tab terminal 71 when tab terminal 71 is inserted perpendicularly into baseplate 21. When the solid copper wires 30 are accommodated in guide grooves 25 formed on the under face of the baseplate 21, baseplate 21 is covered with cover 22.

Each guide groove 25 is formed between two parallel ribs 24 so as to guide the solid copper wire 30 on a predetermined route. The guide groove 25 has a minimum width which is a little larger than a diameter (or width) of the solid copper wire 30, such that the wire 30 is capable of moving slightly within the groove 25.

Figure 5:
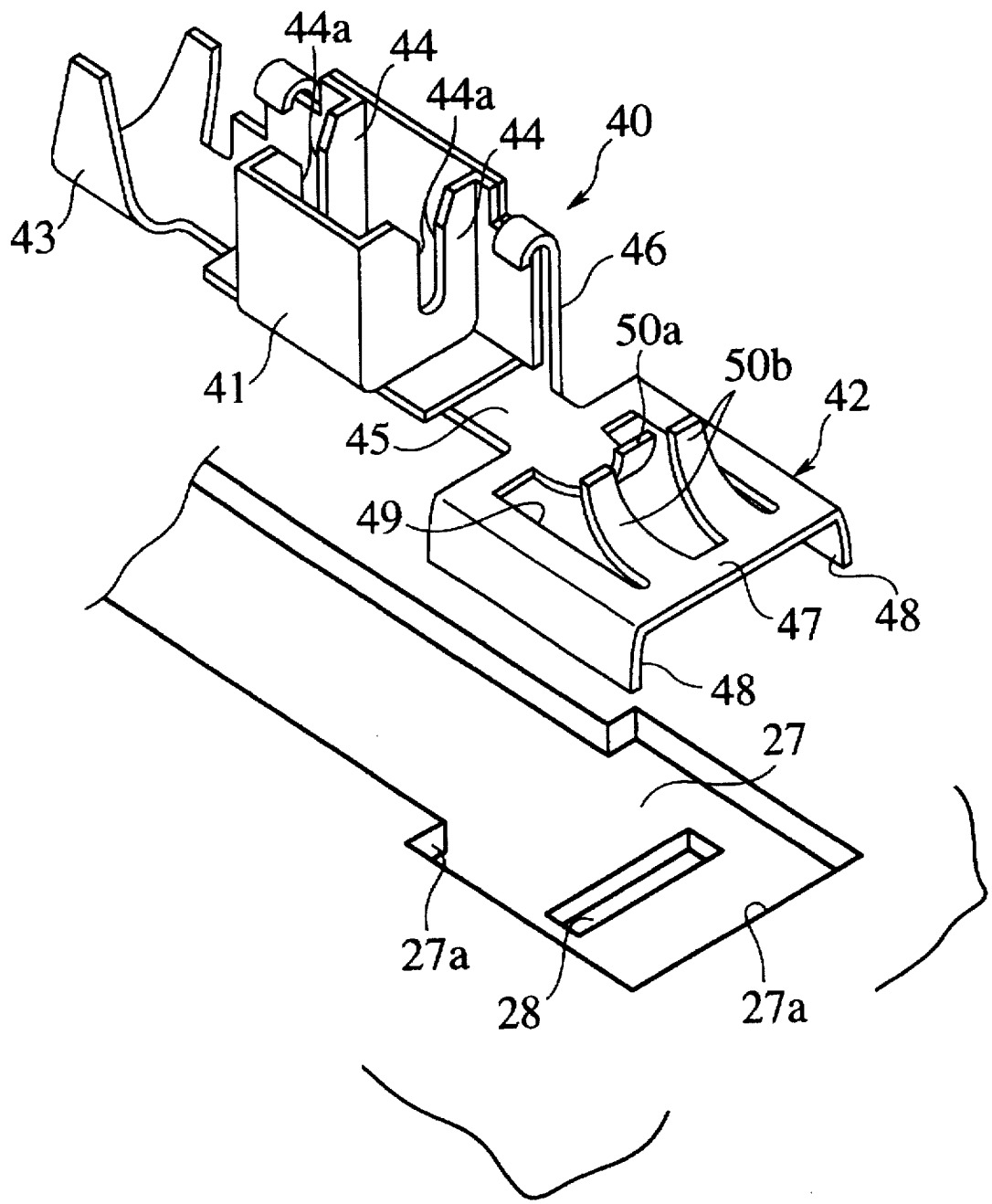
FIG. 5 is a perspective view of a female terminal metal fitting which is used for the distributing board for electrical connection in accordance with the embodiment.
Figure 6:
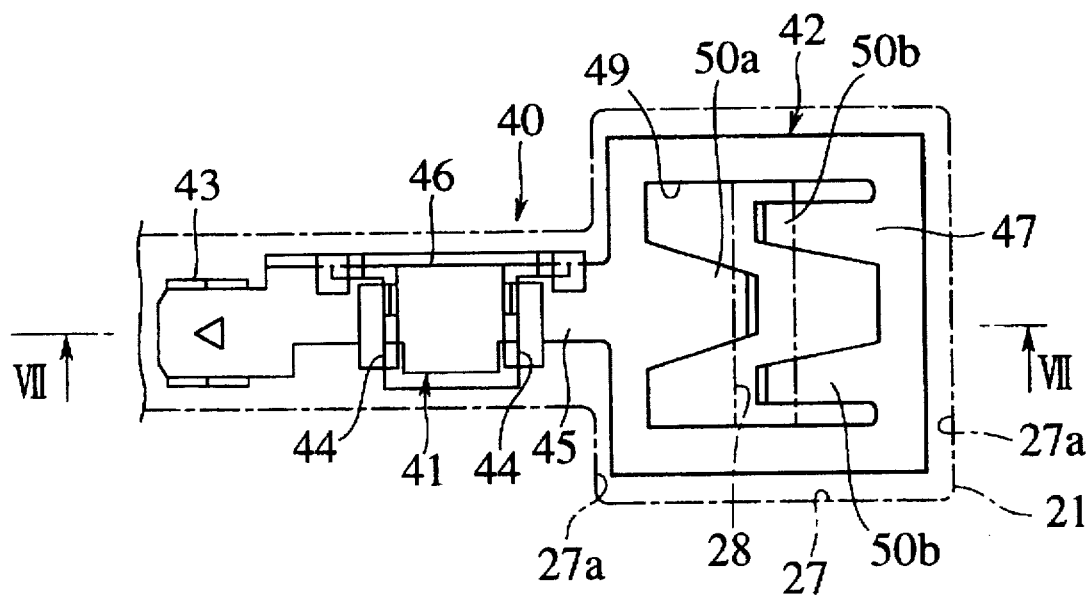
FIG. 6 is a plan view of the female terminal metal fitting of FIG. 5.
Figure 7:
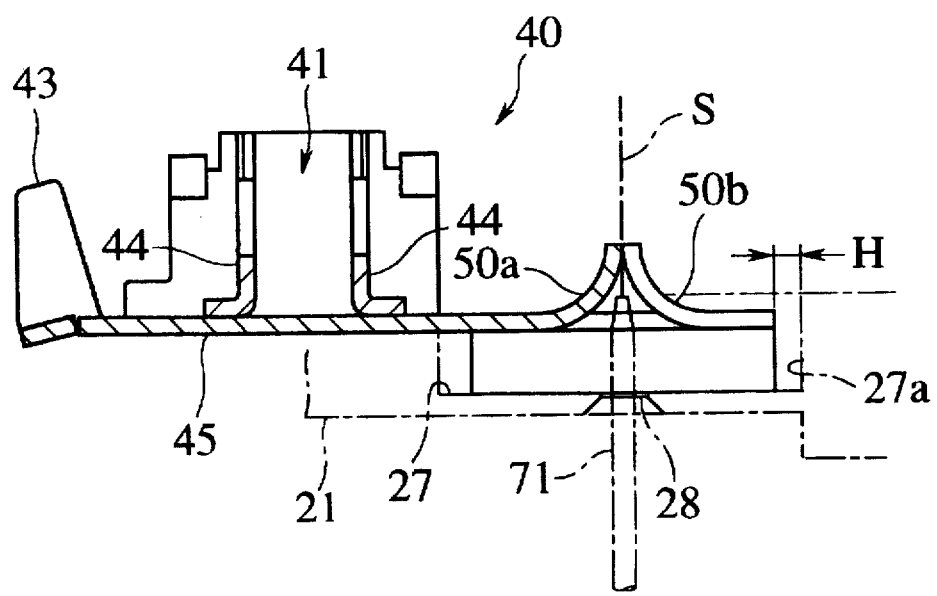
FIG. 7 is a cross sectional view of the female terminal metal fitting, taken alone a line VII—VII of FIG. 6.

As shown in FIGS. 5 to 7, female terminal metal fitting 40 includes the pressure welding part 41 in the middle of the fitting 40 in the longitudinal direction, the terminal fitting part 42 at the front end and a wire crimping part 43 at the rear end, and the female terminal metal fitting 40 is manufactured by bending a sheet of metal plate. Being bent and mounted on a substrate 45, the pressure welding part 41 is formed as a box having two fitting plates 44 positioned apart from each other, and is crimped and fixed to a side plate 46 extending from a side edge of the substrate 45. Each fitting plate 44 is provided with opposing cutting edges 44a between which the solid copper wire 30 is to be pressure fitted.

The terminal fitting part 42 comprises a flat plate part 47 formed in front of and wider than the substrate 45, two marginal walls 48 formed on right and left margins of plate part 47 and extending downwardly therefrom, and three pieces of plate springs 50a, 50b, 50b extending upwardly in an arched configuration from the flat plate part 47. The center plate spring 50a has a base which is associated with a rear edge of a rectangular opening 49 formed in the flat plate part 47 and a free end which is curved so as to abut on an imaginary perpendicular line S (see FIG. 7) at the center of the rectangular opening 49 in the longitudinal direction of the metal fitting 40. Each of the lateral plate springs 50b, 50b on either sides of the center plate spring 50a has a base which is associated with the rear edge of the rectangular opening 49 and a free end which is curved so as to also abut on the perpendicular line S. Consequently, when the tab terminal 71 is inserted into the opening 49 along the imaginary perpendicular line S, respective outer peripheral faces of the curved plate springs 50a, 50b, 50b come in frictional contact with lateral faces of the tab terminal The female terminal metal fitting 40 is accommodated in a recess 27 on the baseplate 21 and positioned so that the imaginary perpendicular line S, which will be referred to "the center line of the terminal fitting part 42" hereinafter, is coaxial with an oblong insertion hole 28 at the bottom of the recess 27. Note, the recess 27 is formed to be larger than the terminal fitting part 42. Consequently, a moving space H (see FIG. 7) can be ensured between the terminal metal fitting 40 and the side walls 27a of the recess 27 so that the fitting 40 can move slightly within the recess 27.

In assembling the distributing board 20, after wiring the solid copper wire 30 so as to suit the female terminal metal fittings 40 to be connected, both ends of the wire 30 are pressure welded to the terminal metal fittings 40. That is, according to the embodiment, it is possible to simplify the assembling work because the internal circuit can be provided only if the solid copper lines 30 are pressure welded. Further, even if it is necessary to change the circuit, it is possible to adapt to such a change immediately by modifying the wiring route and length of the solid copper wire 30. In addition, since the individual solid copper wire 30 are accommodated in the guide grooves 25, such an arrangement facilitates the wiring operation of the wire 30, thereby preventing useless fluttering of wire 30 from occurring.

Figure 8:
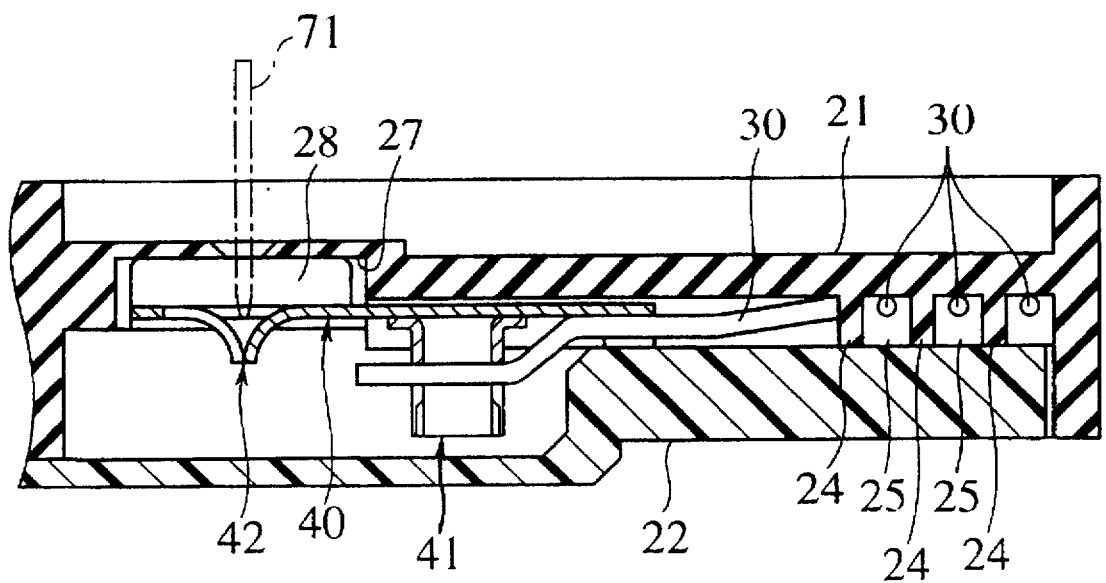
FIG. 8 is an enlarged partial cross sectional view of a part shown with arrow VIII of FIG. 3.

Next, when assembling into the casing of the automatic transmission, the tab terminals 71 of the solenoid valves 15 and the connector 70 are inserted into the female terminal metal fittings 40. At that time, when the tab terminal 71 is coaxial with the center line of the terminal fitting part 42 of the metal fitting 40 as shown in FIG. 8, the tab terminal 71 can be inserted straight among the plate springs 50a, 50b, 50b of the terminal fitting 42 without the metal female terminal fittings moving. Further, even when the tab terminal 71 deviates slightly from being coaxial with the female terminal metal fitting 40, it is possible to join the tab terminal 71 to the female terminal metal fitting 40 while absorbing such a deviation because the fitting 40 is capable of moving within recess 27 to follow a position of the tab terminal 71. Then, since the solid copper wire 30 moves correspondingly in the guide groove 25, the absorption of positional deviation is accomplished without difficulty.

Thus, if only perpendicularly inserting the tab terminals 71 of the solenoid valves 15 and the connector 70 into the distributing board 20 perpendicularly, it is possible to connect the dispersed solenoid valves 15 with the wire harness in a lump. Accordingly, the electrical connection is easily accomplished by the simple structure, thereby improving the functioning of electrical connections In the distributing board 20 for electrical connection, because the circuit is provided by connecting the female terminal metal fittings 40 to each other through the solid copper wire 30, it is possible to improve the accuracy in shape and position, as opposed to the structure where the female terminal is formed in the bus-bar on a press. Therefore, it is possible to improve the reliability of connections with the tab terminals 71.

It is noted that stranded lines, coated lines, bared copper lines, enameled wires or the like may be applicable to the electrical wires. Further, if it exhibits flexibility only in a plane of the baseplate 21, it may be applicable of vertical bus-bars.

Finally, it will be understood by those skilled in the art that the foregoing description is one of preferred embodiments of the disclosed distributing board, and that various changes and modifications may be made to the present invention without departing from the spirit and scope thereof.

What is claimed is:

1. A distributing board for electrical connection with an instrument having a tab terminal, said distributing board comprising:

a baseplate provided with recesses and a guide groove connecting said recesses with each other, said baseplate being made of an insulating material;

a cover for covering said baseplate;

female terminal metal fittings accommodated in said respective recesses; and an electrical wire accommodated in said guide groove to connect said female terminal metal fittings with each other electrically;

wherein each of said female terminal metal fittings comprises:

a terminal fitting part for fitting said tab terminal inserted from outside of said distributing board into said baseplate in a perpendicular direction; and a pressure welding part to which said electrical wire can be pressure welded, wherein, when said electrical wire is accommodated in said guide groove, said baseplate is covered with said cover.

2. The distributing board of claim 1, wherein said electrical wire is a solid copper wire.

3. The distributing board of claim 1 or claim 2, wherein each of said recesses is somewhat larger than each of said female terminal metal fittings, whereby said terminal metal fittings can move slightly within said recesses in the direction of a plane of said baseplate.

4. The distributing board of claim 3, wherein said guide groove has a width larger than a diameter or a width of said electrical wire.

5. The distributing board of claim 4, wherein said pressure welding part is in the form of a box having two opposing fitting plates.

6. The distributing board of claim 5, wherein each of said opposing fitting plates includes opposing cutting edges; wherein said electrical wire is to be pressure welded between said edges.

7. The distributing board of claim 4, wherein said terminal fitting part comprises a flat plate part having a rectangular opening formed therein and a plurality of plate springs extending from said flat plate part in an arched configuration.

8. The distributing board of claim 7, wherein said plate springs include a center plate spring, said center plate spring having a free end curved so as to abut on a center line which passes through a center of a width of said rectangular opening in the longitudinal direction of each of said female terminal metal fittings, and which line is perpendicular to the longitudinal direction of said rectangular opening, and two lateral plate springs arranged one on either side of said center plate spring, said two lateral plate springs having respective free ends curved so as to also abut on the center line.

9. The distributing board of claim 8, wherein said baseplate includes oblong insertion holes formed in bottoms of said recesses.

10. The distributing board of claim 9, wherein said female terminal metal fittings are accommodated in each of said recesses of said baseplate, respectively, and positioned so that the center line passing through said rectangular opening coincides with each of said oblong insertion holes.

* * * * *